United States Patent [19]
Hall et al.

[11] Patent Number: 5,275,368
[45] Date of Patent: Jan. 4, 1994

[54] AUTOMATIC LOCKING TRANSFORMER BRACKET

[75] Inventors: Gaddis G. Hall, deceased, late of Trussville, by Randolf L. Hall, executor; Cecil Morgan, Birmingham, both of Ala.

[73] Assignee: Continental Electric Company, Trussville, Ala.

[21] Appl. No.: 873,245

[22] Filed: Apr. 24, 1992

[51] Int. Cl.$^5$ ............................................ A47B 96/06
[52] U.S. Cl. .................................. 248/218.4; 211/107; 248/231
[58] Field of Search ............... 248/218.4, 219.1, 219.4, 248/219.3, 230, 231; 211/107; 52/697, 40; 174/45 R

[56] References Cited

U.S. PATENT DOCUMENTS

| | | | |
|---|---|---|---|
| 2,114,876 | 4/1938 | Forbes | 248/219.1 |
| 2,333,519 | 11/1943 | Callander | 248/219.1 X |
| 3,374,978 | 3/1968 | Salmon | 248/219.4 X |
| 3,555,747 | 1/1971 | Taylor | 211/107 X |
| 3,734,438 | 5/1973 | Kautz | 211/107 |
| 3,750,992 | 8/1973 | Johnson | 248/219.4 X |
| 4,103,853 | 8/1978 | Bannan | 211/107 X |
| 4,148,456 | 4/1979 | Garchinsky | 248/231 X |
| 4,664,771 | 5/1987 | Docktor | 248/231 X |
| 4,781,348 | 11/1988 | Cutforth | 211/107 X |
| 4,896,856 | 1/1990 | Farmer | 211/107 X |

*Primary Examiner*—J. Franklin Foss
*Attorney, Agent, or Firm*—Veal & Associates

[57] ABSTRACT

A bracket full automatically securing a transformer to a utility pole, wherein the bracket includes an elongated base attached to the utility pole, a multi-linked belt for attaching the base to the utility pole, and a keeper pivotally connected to the base for automatically engaging a carrier connected to the transformer when said carrier is positioned on said keeper. The bracket further includes means for automatically locking the keeper in a closed position about said carrier and means for automatically anchoring a lower portion of the transformer to the base concurrent with the engagement of the carrier by the keeper.

12 Claims, 6 Drawing Sheets

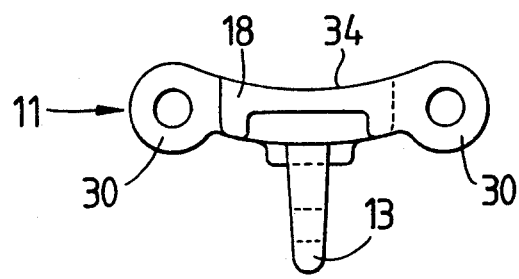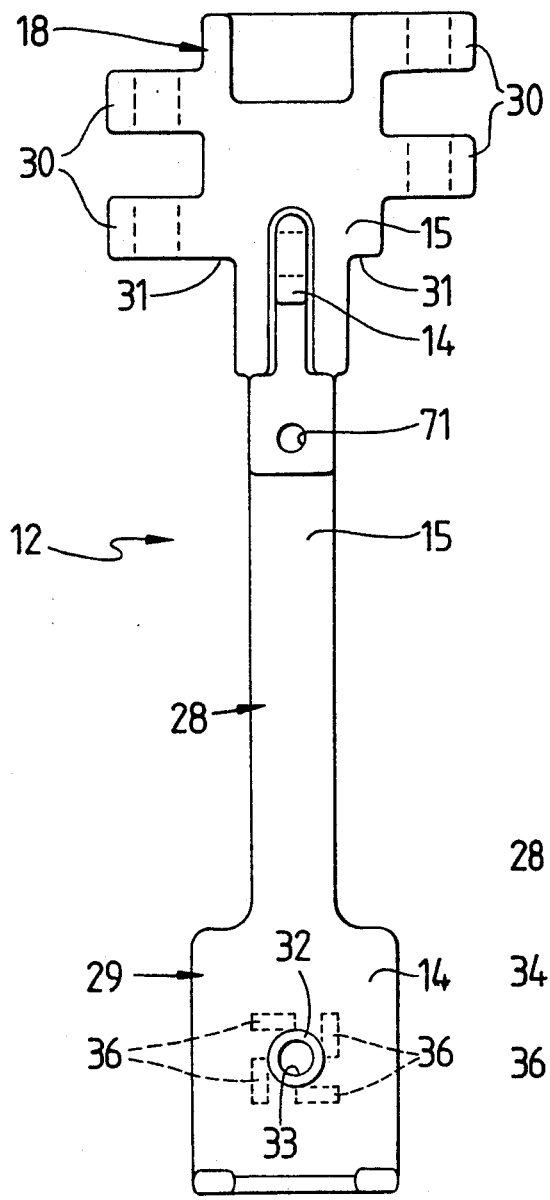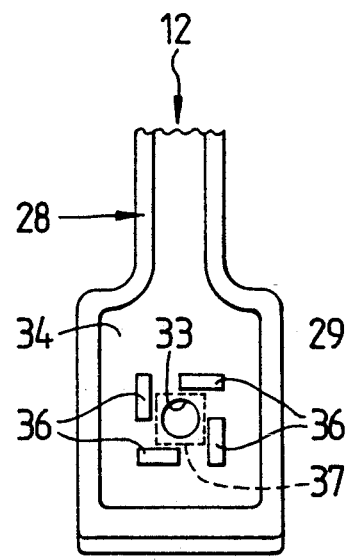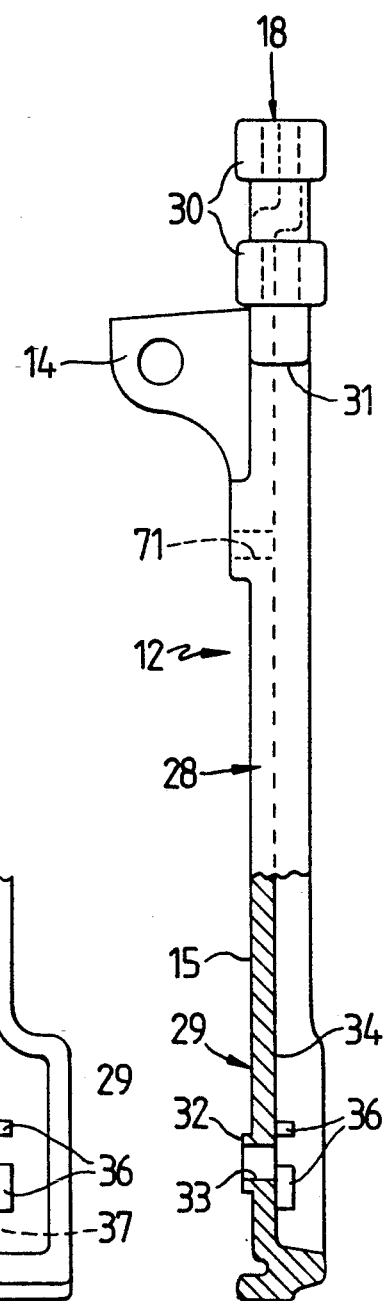
FIG. 6
FIG. 3    FIG. 4    FIG. 5

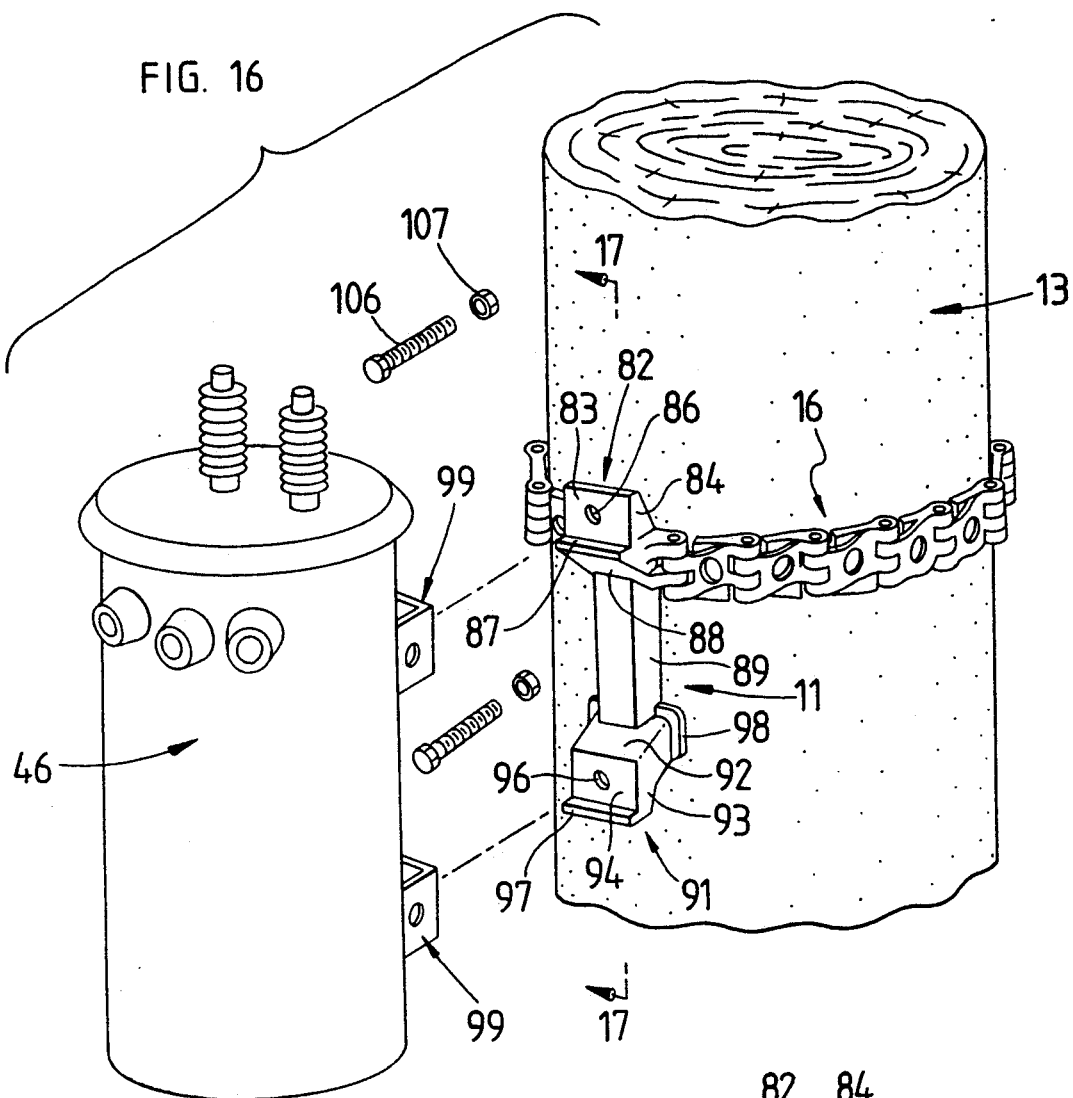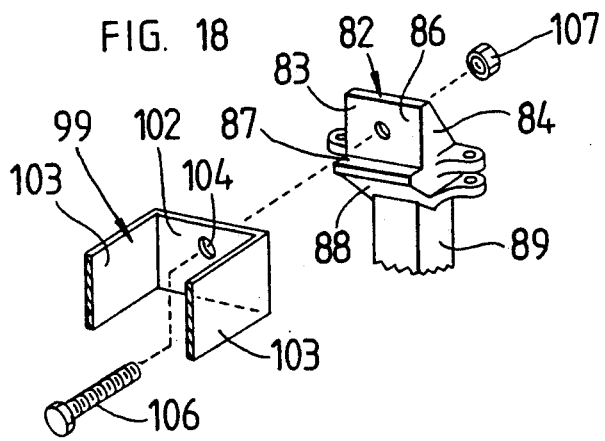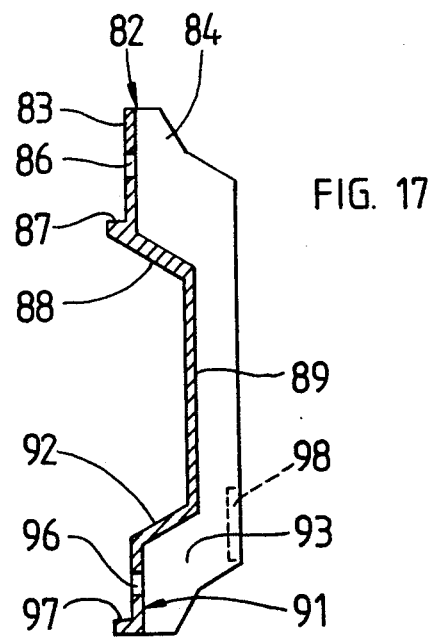

AUTOMATIC LOCKING TRANSFORMER BRACKET

FIELD OF THE INVENTION

The present invention relates to brackets for securing electrical equipment to a vertical utility pole. In greater particularity, the present invention relates to brackets for securing electrical transformers to a utility pole. In even greater particularity the present invention relates to brackets for automatically engaging and locking thereto a selected portion of the electrical transformer when the selected portion is positioned on the bracket.

BACKGROUND OF THE INVENTION

Prior to the conception of the present invention, electrical transformers were mounted to utility poles with the use of a bracket connected to the transformer and secured to the pole by bolts. The bracket had a set of apertures extending therethrough which required manual alignment with a corresponding set of pre-drilled apertures in the utility pole prior to the insertion of the bolts therethrough. The transformer was typically suspended adjacent the apertures during such mounting procedures and as the transformer remained suspended, nuts adapted for threaded engagement of the bolts were secured thereon and tightened to secure the transformer bracket in pressed abutment with the utility pole. Alternatively, a mounting bracket was connected to the pole by the bolts whereby the transformer bracket was subsequently bolted to the mounting bracket. Either method required a relatively substantial amount of time during which the transformer must be suspended adjacent the pole.

Electrical transformers are extremely heavy and present a potential hazard to workers handling such devices when the transformer is being precariously suspended during mounting procedures. Inadvertent error during the suspension of such a transformer could result in its uncontrolled swinging and potential impact with workers, the equipment supporting the workers or electrical lines in the immediate work area. Therefore, it is crucial to minimize the transformer suspension time during which the transformer is mounted and dismounted from a utility pole.

SUMMARY OF THE INVENTION

It is the principal object of the present invention to provide a bracket for mounting an electrical transformer to a utility pole that minimizes the time the transformer must be suspended prior to its connection with the utility pole.

In support of the principal object, another object of the invention is to provide such a bracket that remains mounted to the utility pole and automatically locks in securing engagement with the transformer when the transformer is placed thereon and can be selectively unlocked to immediately release said transformer.

These and other objects and advantages of my invention are accomplished through the use of an elongated support member mounted to a utility pole in parallel abutment therewith having a vertically oriented rib thereon which extends radially from the pole in coplanar relation with the longitudinal axis of the support member. A keeper is pivotally mounted to the vertically oriented rib for movement about a horizontal axis and has a pair of parallel levers thereon for moving the keeper about such horizontal axis. The keeper also includes a clasp member mounted in substantially diametric relation to the levers and a leaf spring detachably mounted to the support member in biased contact with the keeper for selectively locking the keeper in a predetermined position. A carrier adapted for use with the bracket is mounted to the transformer and is selectively positioned between the keeper and the support member to secure the transformer to the pole.

When the keeper is in an open position, the clasp member extends from the pole in angular relation to the support member while the levers extend in normal relation thereto. When the keeper is in a closed position the clasp member extends in spaced relation to the support member while the levers extend in angular relation thereto. Each lever has a rest member on a free end thereof which extends normal to the support member when the keeper is in a closed position. The clasp member includes a lip which extends from an upper end of the clasp member in parallel relation to the rest members.

To secure the transformer to the pole, the keeper is placed in the open position. The carrier, which includes a mounting plate forming a slot, is placed over the vertically oriented rib with the slot receiving the vertically oriented rib and with the lower edges of the mounting plate contacting the levers. The downward force exerted by the weight of the transformer and carrier moves the levers and consequently the entire keeper to the closed position whereby the clasp and the lip portion engage the carrier with the carrier being supported by the rest members. The leaf spring, which is biased against the keeper, snaps into a recess as the keeper is urged to a closed position, whereby the spring prevents movement of the keeper until selectively disengaged from the recesses.

In an alternate embodiment, the support member includes a first mounting block pivotally connected to the flexible belt and having a flange member spaced from the utility pole. The flange member has an aperture therein and a lip portion defining the lower margin thereof. An elongated brace arm is connected to the first mounting block and depends therefrom in substantially parallel relation to the utility pole. A second mounting block, having a flange member with an aperture therethrough and a lip portion connected to and extending along a lower edge thereof, is connected to a lower end of the brace arm. A pair of support lugs are connected to the transformer, one above the other, and each has a mounting plate spaced from the transformer. The mounting plates are spaced on the transformer to accommodate concurrent planar abutment with the flange members and have holes therethrough that correspond with the apertures in the flange members. The transformer is mounted to the utility pole by placing the mounting plates in planar abutment with the flange members and in resting contact with the upper surfaces of the lip portions. The lip portions stabilize the transformer during mounting and thereby facilitate easier alignment of the holes and apertures. Once the holes and apertures are aligned, securing bolts are received therein to secure the support lugs to the mounting blocks. Nuts threadably connected to the bolts are used to tighten the mounting plates in pressed abutment with the flange members.

BRIEF DESCRIPTION OF THE DRAWINGS

Apparatus embodying features of my invention are depicted in the accompanying drawings which form a portion of this disclosure and wherein:

FIG. 3 is a side elevational view of a base portion of the present invention:

FIG. 4 is a broken side elevational view of the base portion taken opposite of FIG. 3;

FIG. 5 is a side elevational view of the base portion taken from the right of FIG. 3:

FIG. 6 is a plan view of the base portion shown in FIG. 3;

FIG. 16 is an exploded perspective view of a second embodiment of the invention;

FIG. 17 is a sectional view taken along line 17—17 of FIG. 17; and

FIG. 18 is an exploded perspective view of the supporting means used in the second embodiment.

DESCRIPTION OF A PREFERRED EMBODIMENT

Figure 1:
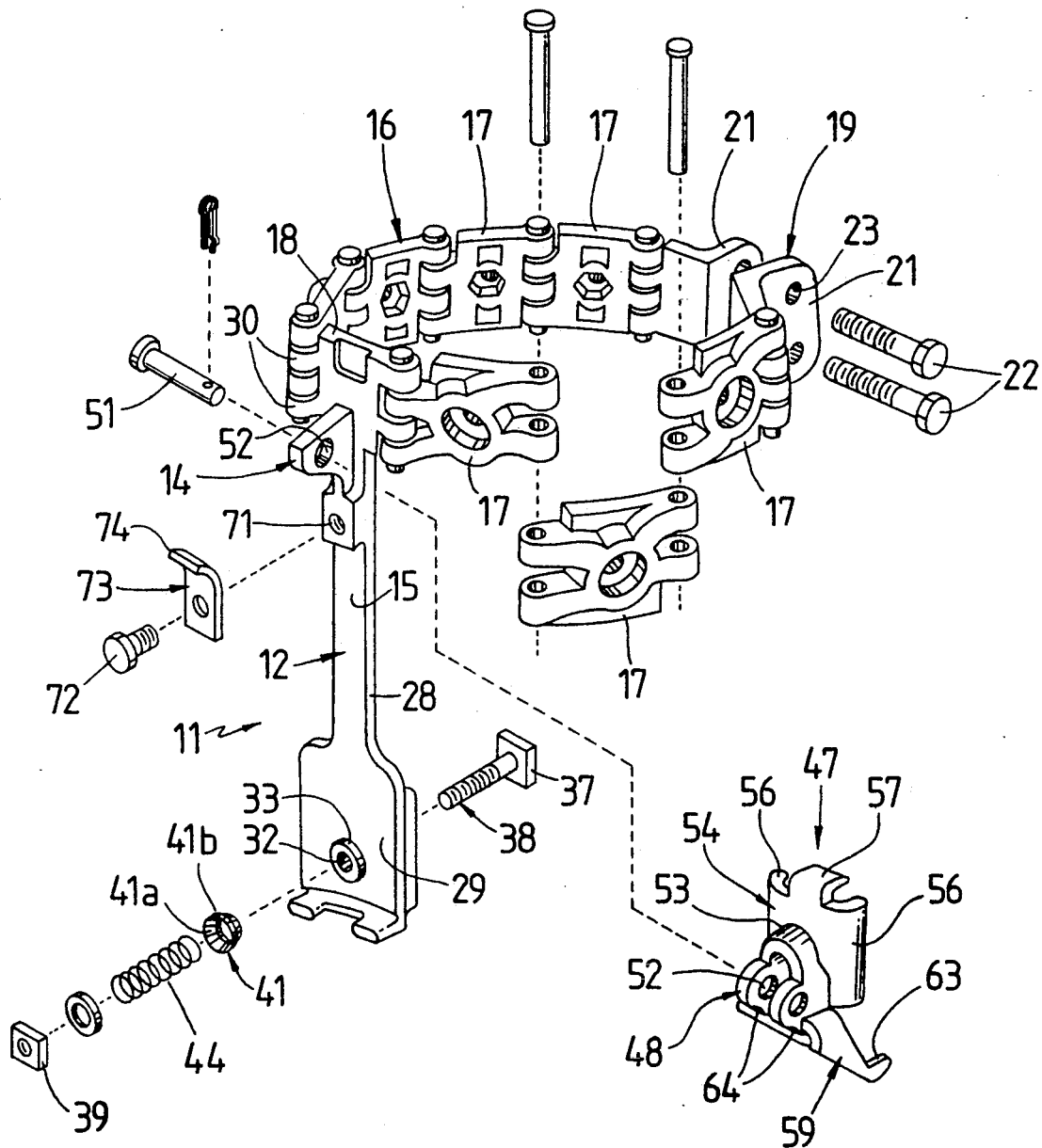
FIG. 1 is an exploded perspective view of the present invention.
Figure 2:
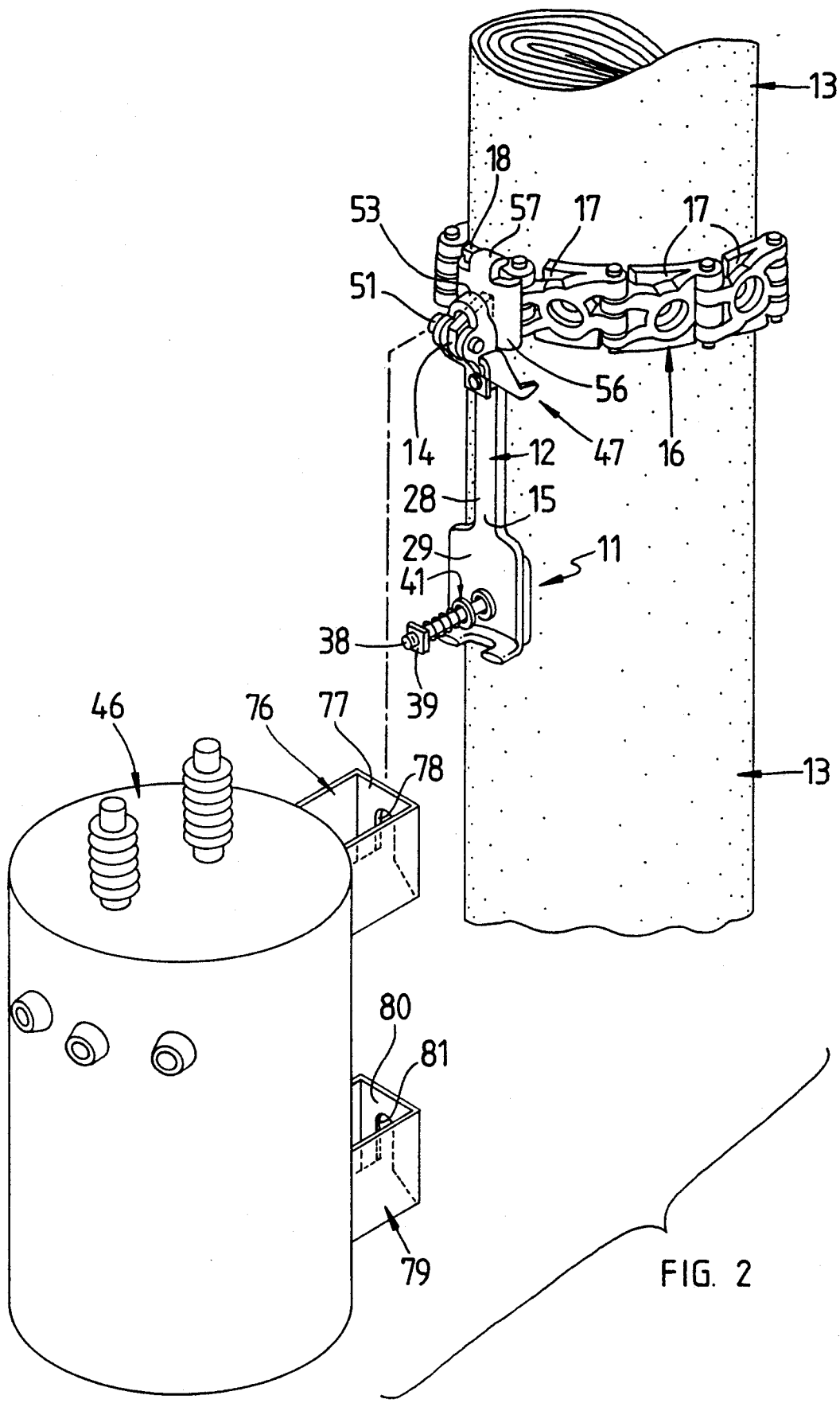
FIG. 2 is a perspective view of the present invention as used to mount a transformer to a utility pole.

Referring to the drawings for a clearer understanding of the invention, it should be noted in FIGS. 1 and 2 that a first embodiment of the present invention contemplates the use of an elongated base 11 which includes an elongated support member 12 connected to a utility pole 13 in parallel relation thereto and a vertically oriented rib 14 integrally formed on an outer face 15 of the support member 12 and extending normal to the face 15 in coplanar relation to the longitudinal axis of the support member 12. A flexible belt 16 is pivotally connected to the support member 12 and wrapped around the pole 13 in pressed abutment therewith. Such belts are well known to those skilled in the art and a variety of means could be used to connect the support member 12 to the pole 13, however, the flexible belt 16 allows the support member 12 to be connected to poles 13 constructed of steel or concrete with which bolts or spikes would be difficult to use.

The belt 16 includes a plurality of pivotally interconnected links 17. A pair of the links 17 are pivotally connected to an upper portion 18 of the elongated support member 12 on opposing lateral edges thereof. Pivotally mounted to the belt 16 forming a section thereof is a pull joint 19 having two half-portions 21, each detachably secured to the other by a plurality of bolts 22 which extend through A plurality of apertures 23 in the half-portions 21. As shown in FIGS. 3-5, the support member 12 includes the upper portion 18, an elongated neck portion 28 integrally connected to the upper portion 18 in substantial coplanar relation thereto and a lower portion 29 integrally connected to the neck portion 28 opposite the upper portion 18 in substantially coplanar relation thereto. The upper portion 18 includes two pair of eyes 30 on which selected links 17 of said belt 16 are pivotally connected. The upper portion 18 is wider than the neck portion 28 having two horizontal stop surfaces 31 defined thereon at either side of the neck portion 28. A boss 32 is integrally formed on the outer face 15 of the lower portion 29 and circumscribes a cylindrical aperture 33 extending through the lower portion 29 in normal relation thereto. The support member 12, as shown in FIGS. 4-6, includes an inner face 34 on which a plurality of rectangular cleats 36 are integrally formed proximal the aperture 33. The cleats 36 are spaced about the aperture 33 to receive a head portion 37 of a bolt 38 in non-rotational engagement therebetween.

Figure 7:
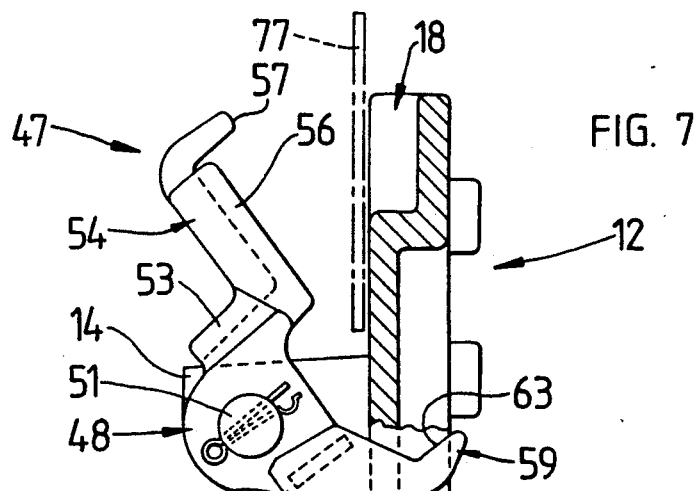
FIG. 7 is a partially sectional side elevational view of the present invention with the keeper in the open position.
Figure 8:
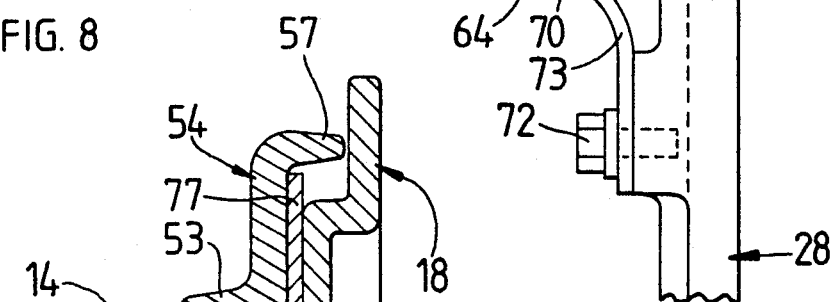
FIG. 8 is a partially sectional side elevational view of the present invention with the keeper in a closed position.
Figure 9:
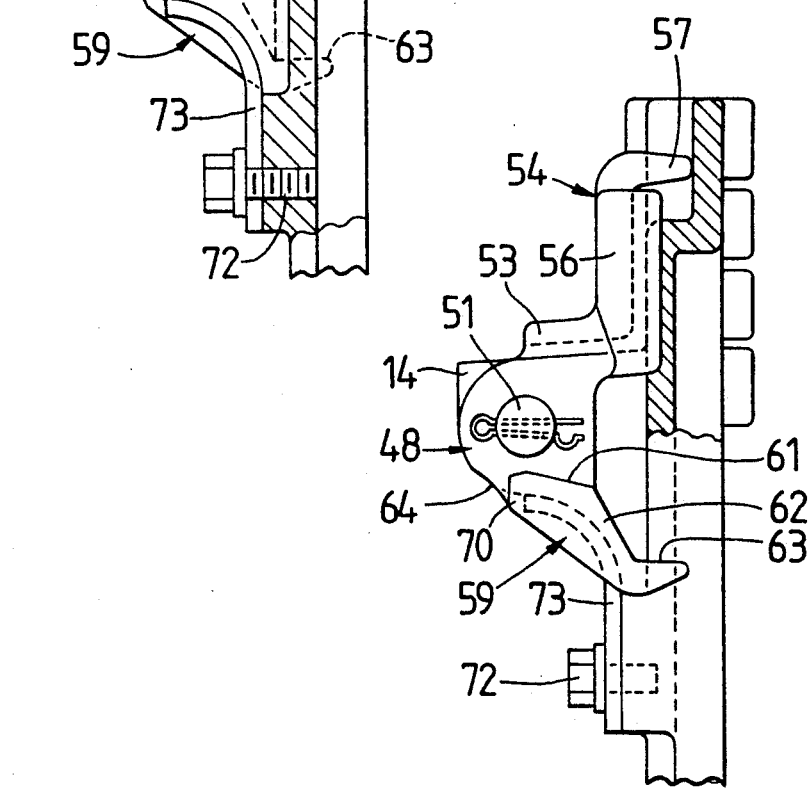
FIG. 9 is a partially sectional side elevational view of the present invention with the keeper in a closed position.
Figures 10, 11, 12:
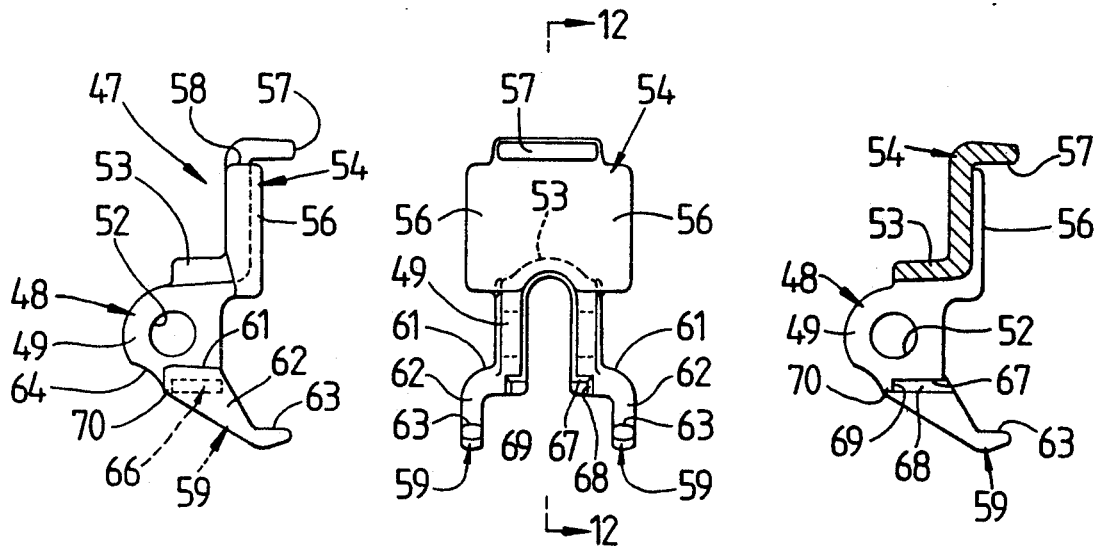
FIG. 10 is a side elevational view of the keeper.
FIG. 11 is a side elevational view of the keeper taken from the left of FIG. 10.
FIG. 12 is a sectional view of the keeper taken along line 12—12 of FIG. 11.

As shown in FIG. 1, the bolt 38 extends through the aperture 33 and is threadably engaged by a nut 39. A cup washer 41 having a concave face 41a and a convex face 41b is slidably mounted to the bolt 38 with the convex face oriented toward the outer surface 15 of the support member 12. A first coil spring 44 is mounted in concentric engagement about the bolt 38 intermediate the nut 39 and the cup washer 41 and biases the cup washer 41 toward the support member 12. The inner face 34 is shown in FIG. 5 to be substantially arcuate to accommodate abutment with a substantially cylindrical utility pole 13; however, as one skilled in the art will realize, the inner face 34 can be shaped in any form to accommodate engagement with other predetermined surfaces. As shown in FIGS. 7-9, pivotally mounted to the base 11 for automatically securing transformer 46 to the base 11 is a keeper 47 pivotally mounted to the vertically oriented rib 14 for movement about a horizontal axis from an opened position as shown in FIG. 7 to a closed position as shown in FIGS. 8 and 9. As shown in FIGS. 10-12, the keeper 47 includes a clevis 48 having a pair of eyes 49 formed therein for cooperative engagement by a pin 51 which extends through a cylindrical aperture 52 through the vertically oriented rib 14.

The clevis 48 includes an arcuate gusset 53 which is integrally connected between eyes 49. A clasp member 54 is integrally connected to the gusset 53 and includes a plate 56 which extends from the gusset 53 in substantially spaced relation to the support member 12 when the keeper 47 is in the closed position. A lip portion 57 is integrally formed along an uppermost edge 58 of the plate 56 in perpendicular extension therefrom toward the support member 12.

Integrally connected to the clevis 48 for automatically tripping or moving the keeper 47 to the closed position are a pair of levers 59, each formed adjacent an eye 49 in substantially diametric relation to the gusset 53. Each lever 59 has a shoulder 61 that extends laterally from an adjacent eye 49 to a point beyond a lateral edge of the neck portion 28 and a lug 62 extending from the shoulder 61 downwardly and rearwardly beside a lateral edge of the neck portion 28. A rest member 63 is integrally connected to a lowermost end of each lever 59 and abuts the stop surfaces 31 of the upper portion 18 when the keeper 47 is urged to the open position. The clevis 48 includes an arcuate spring groove 64 formed on the outer surface thereof intermediate each eye 49 and each shoulder 61. An internal shoulder 66 is formed inwardly of each shoulder 61. Each internal shoulder 66 is defined by a set of orthogonal walls including an upper wall 67, a lateral wall 68 and an inner wall 69. The internal shoulders 66 are symmetrically oriented on the clevis 48 in mirror-image relation, and are spaced from the adjacent spring groove 64 by a surface 70 therebetween. A leaf spring 73 is detachably secured to a bolt 72 received in a tapped hole 71 through the support member 12 subjacent the vertically oriented rib 14 for automatically locking the keeper 47 in the closed position. The spring 73 has a terminus 74 that slidingly contacts the arcuate spring grooves 64 when the keeper 47 is in an open position. When the keeper 47 is urged to the closed position, the terminus 74 follows the arcuate surfaces of the spring grooves 64 over the surfaces 70, and snaps within the internal shoulders 66 thereby locking the keeper 47 in the closed position.

Figures 13, 14, 15:
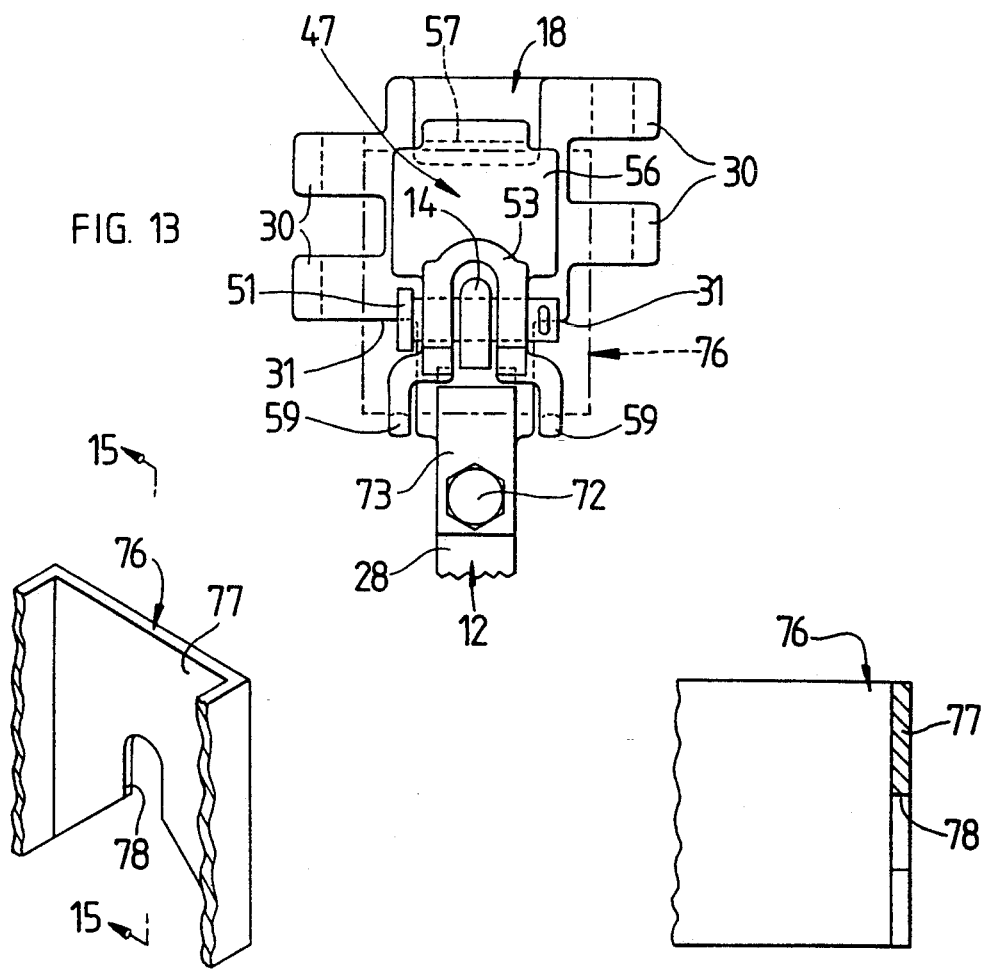
FIG. 13 is a broken side elevational view of an upper portion of the base with the keeper connected thereto.
FIG. 14 is a broken perspective view of the carrier.
FIG. 15 is a sectional view taken along line 15—15 of FIG. 1.

As generally shown in FIG. 2 and more specifically in FIGS. 14 and 15, a carrier 76 is mounted to the transformer 46 and includes a mounting plate 77 having a vertical slot 78 defined therein. Anchoring the transformer 46 parallel the pole 13 is a stabilizer 79 mounted to the transformer 46 below the carrier 76. The stabilizer 79 has a mounting plate 80 having a vertical slot 81 therein.

To mount the transformer 46 to the base 11, the keeper 47 must first be moved to the open position. The mounting plate 77 is lowered onto vertically oriented rib 14 which is received within the slot 78. The downward movement of the mounting plate 77 brings the plate 77 into contact with the levers 59 thus moving the keeper 47 to the closed position, whereupon the lower edge of the mounting plate 77 comes to rest on the rest members 63 while the lip portion 57 extend over the top of the mounting plate 77. The second mounting plate 80 simultaneously receives the bolt 38 within the slot 81. The mounting plate 80 is wedged between the outer face 14 and the cup washer 41 thereby forcing the cup washer 41 against the bias of the spring 44. The bolt 38, cup washer 41 and spring 44 in combination serve to bias the stabilizer against the base 11. The keeper moves from the open to the closed position and the spring 73 snaps within the internal shoulder 66 thereby locking the carrier 76 and transformer to the base 11.

As shown in FIGS. 16–18, a second embodiment of the present invention includes a cast elongated base 11 having a first mounting block 82 pivotally connected to the flexible belt 16. The belt 16 extends around the utility pole 13 at a predetermined height and holds the first mounting block 82 in pressed abutment therewith. The first mounting block 82 includes a vertical face member 83 supported in spaced relation to the utility pole 13 by a pair of side panels 84. The side panels 84 are integrally connected to the lateral edges of the face member 83 and extend toward the utility pole 13 to space the face member 83 therefrom. Integrally formed with the side panels are the connective members for engagement with selected links of the flexible belt 16 to secure the same to the utility pole 13. The face member 83 defines an aperture 86 therein and terminates at a horizontal lip portion 87 integrally formed with and extending from a lowermost margin thereof. As shown in FIG. 17, a wall 88 is integrally connected to the lower edges of the side panels 84 and to the lip portion 87. The wall 88 slants downwardly from the horizontal lip portion 87 toward the utility pole 13. A substantially rectangular, elongated brace arm 89 is integrally connected to the wall 88 and depends therefrom in substantially parallel relation to the utility pole 13. A second mounting block 91 is integrally connected to a lower end of the brace arm 89 and is supported by the brace arm 89 in beneath the first mounting block 82. The second mounting block 91 includes a upper wall plate 92 integrally connected to the brace arm 89. The upper wall 92 extends upwardly toward the utility pole 13 and converges with the brace arm 89. A second pair of side panels 93 are connected to opposing lateral edges of the upper wall 92. A second face member 94 is integrally connected to the forward edges of the upper wall 92 and side panels 93 in substantially coplanar relation to the face member 94. The face member 94 is spaced from the utility pole by the connector plate 92 and side panels 93 and has an aperture 96 defined therein. A lip portion 97 is connected to and extends from a lower edge of the flange member 94. A pair of flanges 98 are integrally connected to the rearward edges of the side panels 93 and connector plate 92. The support flanges 98 abut the utility pole 13 to stabilize the second mounting block 91 therein.

As shown in FIG. 16, first and second support lugs 99 and 101 are connected to the transformer in a vertical plane and are spaced apart a vertical distance approximately equal to the distance between flange members 83 and 94. As shown in FIG. 18, the support lugs 99 and 101 are U-shaped each having a mounting plate 102 spaced from said transformer by support members 103 connected to opposing lateral edges of said mounting plate 102 and to said transformer. Each mounting plate 102 defines a hole 104 therein. The holes 104 are spaced apart to correspond with apertures 86 and 96.

In operation, the flexible belt 16 and base 11 are secured to the utility pole at a selected height. The transformer is lifted proximate the base 11 with the mounting plates 102 being positioned in planar abutment with the flange members 83 and 94. The mounting plates 102 are rested on lip portions 87 and 97 which stabilize the transformer during the mounting process and aid in the alignment of holes 104 with apertures 86 and 96. To align the holes 104 and apertures 86 and 96, the mounting plates 102 are manually urged across lip portions 87 and 97. Once the holes and apertures are aligned, securing bolts 106 are received therein to secure the mounting plates 102 to the flange members 83 and 94. The mounting plates 102 are held in abutment with flange members 83 and 94 by securing nuts 107 which are threadably connected to bolts 106. From the foregoing, it should be clear that the present apparatus provides a bracket for efficiently and safely mounting a transformer to a utility pole while minimizing the suspension time necessary to facilitate such mounting and consequently represents a substantial improvement over the prior art.

While I have shown this invention in one form, it will be obvious to those skilled in the art that it is not so limited but is susceptible of various changes and modifications without departing from the spirit thereof.

What I claim Is:

1. A bracket used in conjunction with an electrical transformer and a utility pole for detachably connecting said transformer to said utility pole, comprising:

(a) a base comprising an elongated support member connected to said utility pole and extending in parallel abutment therewith and a vertically extending rib integrally connected to said support member in normal relation thereto; and (b) means pivotally mounted to said vertically extending rib for movement about a horizontal axis and for automatically securing said transformer to said base, wherein said pivotally mounted securing means defines a keeper pivotally mounted to said vertically extending rib for automatically engaging a carrier connected to said transformer and means for automatically locking said keeper in a closed position when said keeper is urged from an open position to said closed position by the placement of said carrier on said pivotally mounted securing means, wherein said locking means comprises a leaf spring detachably secured to said elongated support member subjacent said keeper and having a terminus in sliding contact with said keeper is in said open position and internal shoulders formed on said keeper for abutting a free end of said spring when said keeper is urged to said closed position to lock said keeper in said closed position thus preventing the retraction of said carrier from said pivotally mounted securing means.

2. A bracket as described in claim 1 wherein said keeper comprises:

(a) a clevis pivotally mounted to said vertically extending rib for movement about a horizontal axis;

(b) a clasp member integrally connected to said clevis for automatically engaging said carrier when said keeper is urged to a closed position, wherein said clasp member is pivoted to a vertically extending position in substantially spaced relation to said support member when said keeper is urged to said closed position;

(c) tripping means connected to said clevis for automatically moving said clasp member to said closed position, wherein said carrier when positioned on said securing means contacts said tripping means, and urges the same about said horizontal axis.

3. A bracket as described in claim 2 wherein said clasp member comprises:

(a) a substantially rectangular plate integrally connected to and extending from said clevis for concomitant rotation therewith; an (b) a lip portion integrally connected to the uppermost edge of said rectangular plate and extending perpendicularly therefrom toward said support member.

4. A bracket as described in claim 2 wherein said tripping means comprises a pair of levers, each integrally connected to said clevis in angular relation to said clasp member and in normal relation to said support member when said keeper is in an open position, wherein said carrier contacts said levers when said carrier is positioned on said securing means and thus urges said lever, said clevis and said clasp member about said horizontal axis to said closed position.

5. A bracket as described in claim 4 wherein said tripping means further comprises a pair of rest members, each connected to a lowermost end of said lever to support said carrier when said keeper is urged thereby to said closed position.

6. A bracket as described in claim 1 further comprising a flexible belt connected to said support member and detachably secured to said pole at a predetermined height.

7. A bracket as described in claim 6 wherein said belt comprises a plurality of interconnected links pivotally connected to said support member and wrapped around said pole in pressed abutment therewith, wherein said links and said support member are secured to said pole and tightened in pressed abutment therewith by a pull joint having detachably connected half portions pivotally connected intermediate a selected adjacent pair of said links.

8. A bracket as described in claim 1 further comprising means connected to said base for anchoring a lower portion of said transformer simultaneously with the engagement of said carrier by said securing means, wherein said transformer is secured to said base in parallel relation thereto.

9. A bracket as described in claim 8 wherein said anchoring means comprises:

(a) a stabilizer mounted to said transformer below said carrier; and (b) means connected to said base for engaging said stabilizer concurrently with the engagement of said carrier by said keeper, wherein said stabilizer is secured in non-moving relation to said base by said engaging means.

10. A bracket as described in claim 9 wherein said stabilizer comprises a mounting plate connected to said transformer in spaced relation thereto and forming a vertical slot for partial reception of said engaging means therein.

11. A bracket for detachably connecting an electrical transformer to a utility pole, comprising:

(a) a base having an elongated support member connected to said utility pole and extending in parallel abutment therewith and a vertically extending rib integrally connected to said support member in normal relation thereto;

(b) means pivotally mounted for movement about a horizontal axis securing a transformer to said base, wherein said securing means automatically engages a carrier connected to said transformer when said carrier is positioned on said securing means; and p1 (c) means connected to said base for anchoring a lower portion of said transformer simultaneously with the engagement of said carrier by said securing means, wherein said transformer is secured to said base in parallel relation thereto, wherein said anchoring means comprises a stabilizer mounted to said transformer below said carrier and means connected to said base for engaging said stabilizer concurrently with the engagement of said carrier by said keeper, wherein said stabilizer is secured in non-moving relation to said base by said engaging means and wherein said stabilizer comprises a mounting plate connected to said transformer in spaced relation thereto and forming a vertical slot for partial reception of said engaging means therein and said bracket wherein said engaging means comprises a bolt extending normally through said supporting member below said vertically extending rib and having a nut threadably connected thereto and a cup washer having a concave face and convex face oriented toward said support member and a coil spring mounted in concentric engagement about said bolt intermediate said nut and said cup washer for biasing said cup washer toward said support member, wherein said mounting plate is received intermediate said cup washer and said support member and is biased thereagainst by said coil spring concurrently with the engagement of said carrier by said securing means.

12. A bracket for detachably connecting an electrical transformer to a utility pole, comprising:
 (a) a base mounted to said utility pole consisting of an elongated support member connected to said utility pole and extending in parallel abutment therewith, and a vertically extending rib integrally connected to said support member in normal relation thereto;
 (b) means pivotally mounted to said vertically extending rib for movement about a horizontal axis in order to automatically secure said transformer to said vertically extending rib, wherein said securing means automatically engages a carrier connected to said transfomer when said carrier is positioned on said vertically extending rib; and
 (c) wherein said securing means is automatically engaged via a tripping means comprised of a pair of levers, each integrally connected to said clevis in angular relation to said clasp member and in normal relation to said support member when said keeper is in an open position, wherein said carrier contacts said levers when said carrier is positioned on said securing means and thus urges said lever, said clevis and said clasp member about said horizontal axis to said closed position.

* * * * *